United States Patent
Tritchkov

(10) Patent No.: US 12,314,158 B2
(45) Date of Patent: May 27, 2025

(54) TESTING IOT-APPLICATIONS BASED ON A FLEET OF IoT-DEVICES

(71) Applicant: Siemens Aktiengesellschaft, Munich (DE)

(72) Inventor: Ivan Tritchkov, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 41 days.

(21) Appl. No.: 17/625,405

(22) PCT Filed: Apr. 14, 2020

(86) PCT No.: PCT/EP2020/060390
§ 371 (c)(1),
(2) Date: Jan. 7, 2022

(87) PCT Pub. No.: WO2021/008743
PCT Pub. Date: Jan. 21, 2021

(65) Prior Publication Data
US 2022/0269595 A1 Aug. 25, 2022

(30) Foreign Application Priority Data
Jul. 18, 2019 (EP) .................................... 19187056

(51) Int. Cl.
*G06F 11/3668* (2025.01)
(52) U.S. Cl.
CPC ................ *G06F 11/3688* (2013.01)
(58) Field of Classification Search
CPC ....... G06F 11/36–3696; G06F 11/3698; H04L 43/50
See application file for complete search history.

(56) References Cited

U.S. PATENT DOCUMENTS 6,163,805 A * 12/2000 Silva ................... G06F 11/3664
709/227
7,451,351 B2 * 11/2008 Gunnmarker ....... G06F 11/2236
714/E11.166

(Continued)

FOREIGN PATENT DOCUMENTS

EP         3324601 A1    5/2018
WO    2016141973 A1    9/2016

OTHER PUBLICATIONS

Internet: https://en.wikipedia.org/wiki/Digital_twin version Jul. 16, 2019.

(Continued)

*Primary Examiner* — Todd Aguilera
(74) *Attorney, Agent, or Firm* — Schmeiser, Olsen & Watts LLP

(57) ABSTRACT

Testing IoT-applications based on a fleet of IoT-devices is provided. For this purpose, a method includes determining whether a device entry of a device registry matches with a request entry of a request registry, wherein the device entry is indicative of an IoT-device and the request entry is indicative of an IoT-application. The method further includes establishing an executable test case, if the device entry matches with the request entry. Furthermore, the method includes testing the IoT-application, wherein the testing includes executing the executable test case on the IoT-device. Likewise, an IoT platform includes a fleet of IoT-devices and is adapted to perform the previous method.

13 Claims, 2 Drawing Sheets

(56) References Cited

U.S. PATENT DOCUMENTS

| | | | |
|---|---|---|---|
| 8,621,434 B2* | 12/2013 | Campion | G06F 11/3466 |
| | | | 717/124 |
| 10,983,903 B1* | 4/2021 | Yawalkar | H04L 43/50 |
| 2003/0120776 A1* | 6/2003 | Avvari | G06F 11/3664 |
| | | | 709/225 |
| 2006/0248509 A1* | 11/2006 | Gunnmarker | G06F 11/2236 |
| | | | 714/E11.166 |
| 2009/0007074 A1* | 1/2009 | Campion | G06F 9/5072 |
| | | | 717/124 |
| 2009/0307763 A1* | 12/2009 | Rawlins | G06F 11/2294 |
| | | | 714/E11.002 |
| 2016/0044520 A1 | 2/2016 | Iyer et al. | |
| 2017/0220458 A1 | 8/2017 | Finger et al. | |

OTHER PUBLICATIONS

PCT International Search Report and Written Opinion of International Searching Authority mailed May 18, 2021 corresponding to PCT International Application No. PCT/EP2020/060390 filed Apr. 14, 2020.

* cited by examiner

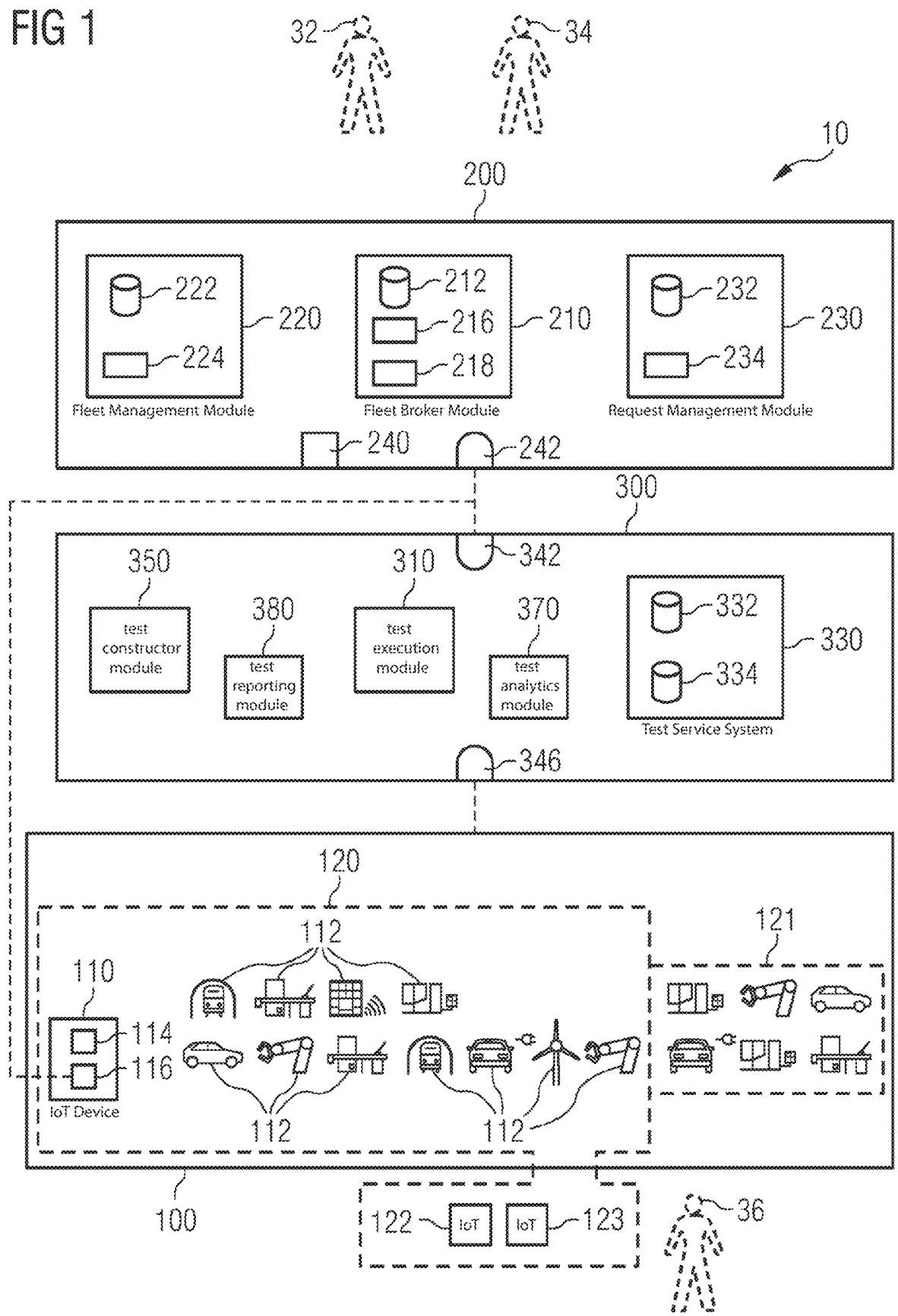

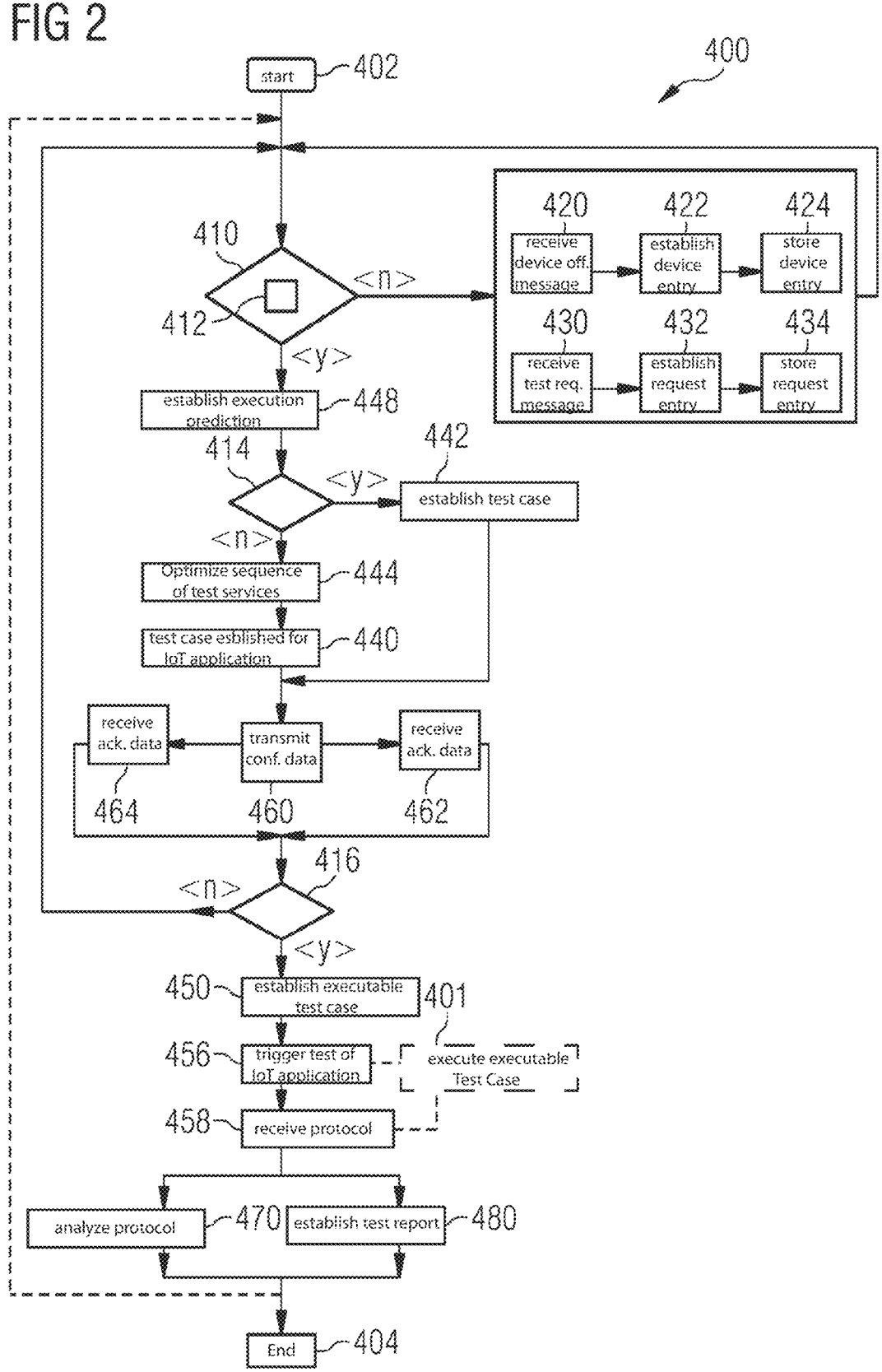

TESTING IOT-APPLICATIONS BASED ON A FLEET OF IoT-DEVICES

CROSS-REFERENCE TO RELATED APPLICATIONS

This application claims priority to PCT Application No. PCT/EP2020/060390, having a filing date of Apr. 14, 2020, which is based off of EP Application No. 19187056.7, having a filing date of Jul. 18, 2019, the entire contents both of which are hereby incorporated by reference.

FIELD OF TECHNOLOGY

The following relates to the field of testing of IoT-applications, and more particularly is directed to a computer-implemented method for testing an application, a system for testing an application, a fleet broker system, a test management system for testing applications, and a respective computer program.

BACKGROUND

Currently there is a trend of digitalization in the industry domain. Hence, e.g., a manufacturing process for a product may be digitally controlled. For describing several facets of this trend the term "Industry 4.0" (in German: "Industrie 4.0") is a commonly used. It has become not only a major part of today's industry, but it also drives the business in many industrial domains.

A core facet underlying Industry 4.0 and the digitalization is the connectivity of different devices to the Internet. This results in the so called IoT (Internet of Things) used as a hypernym for a network of heterogeneous devices—e.g. IoT-devices (Internet of Things devices)—connected to and through the Internet. Thus, devices and systems participating, e.g., in manufacturing processes or end products of such a manufacturing processes may be connected to cloud platforms or the Internet, e.g., for connecting and/or controlling them. Based on this, several applications, tasks or services may be facilitated across different domains such as: preventive maintenance, load prediction, real-time production monitoring, or pay-per-use billing.

In view of Industry 4.0 several companies are providing IoT platforms, which are offering such applications/tasks/services for the devices connected to their platforms, e.g.: Siemens MindSphere, AWS IoT by Amazon, Bosch's IoT Suite, Microsoft's Azure IoT Suite, IBM Watson, or GE Predix. Such an IoT platform may be designed as an—so-called—"ecosystem platform" such that other companies or entities (also called 3rd parties) can develop applications or apps, in particular IoT-applications (Internet of Things applications), and upload these—e.g. against a fee—in the respective IoT-platform. Other companies can make use of the services offered by the apps either by buying the apps or via pay-per-use licensing. This may create a scenario with a win-win situation for all participating parties: (i) the platform provider profits from developer and user licenses for its platform, as well as from the fees paid to upload an app and also a certain amount for every purchased app, (ii) IoT device owner can optimize his production process by using dedicated apps without spending money and efforts for the app development; (iii) app developers earn money from the companies by selling apps and services to them.

Yet, in such a scenario, quality assurance of IoT-applications, which may be developed and/or provided by third parties as, e.g., third-party apps, or—likewise—a platform provider, who does not necessarily own all IoT devices connected to the platform, may pose a challenge. The app providers/developers have to make sure that their apps run smoothly on the target IoT-devices and they cannot cause any damage. The IoT platform provider has on other hand to ensure that services offered by him (e.g. app deployment, app configuration, data transfer etc.) also work as expected in the combination with the IoT-devices.

For quality assurance, such an IoT-application may be tested and, e.g., executed. For this purpose, fully equipped and functional IoT-devices, which may execute the IoT-application, are currently employed in test cases. Additionally, simulators and emulators, which are software-based programs imitating the behaviour of a physical IoT-device, are currently used. However, using fully-equipped IoT-devices may increase the cost of testing, and thus, of developing IoT-applications, whereas using simulators/emulators limits the testing to such IoT-devices that are available within a simulators/emulator as well as limits the testing to a precision of simulation.

SUMMARY

There is a demand to improve quality assurance of an application and/or testing of an application, e.g. as a facet of quality assurance.

This demand is met by a computer-implemented method for testing an application based on a fleet of devices, by a system for testing an application based on a fleet of devices, by a fleet broker system for a fleet of devices, by a test management system for testing applications based on a fleet of devices, and by a computer program and by a computer program product. Various embodiments, advantageous modifications and further improvements are provided.

A first aspect of embodiments of the present invention is directed to a computer-implemented method for testing an application—in particular an IoT-application—based on a fleet of devices—in particular a fleet of IoT-devices. The method comprises determining whether a device entry of a device registry matches with a request entry of a request registry, wherein the device entry is indicative of a device of the fleet and the request entry is indicative of the application. The method further comprises establishing an executable test case, if the device entry matches with the request entry. Furthermore, the method comprises triggering testing the application, wherein the testing comprises executing the executable test case on the device.

An advantage of determining the device entry that matches with the request entry may particularly be that IoT-devices associated with the fleet may be offered—e.g. as a service—for testing IoT-applications, i.e. in particular, for testing the IoT-application as indicated by the request entry. By establishing the executable test case, all data required for testing the IoT-application may be bundled, whereby performing of the testing of the IoT-application may be facilitated, i.e. in particular, the IoT-device may be triggered to execute the executable test case. An advantage of executing the executable test case on the IoT-device may particularly be, that the IoT-application is tested on the IoT-device, which has been specified by the request entry, and thus, analysing some physical processes and/or properties of the IoT-device—such as temperature change, overheating, etc.—and/or some software aspects like non-functional performance may be facilitated, in particular with a higher precision, in particular compared to a generic simulator/emulator. Hence, testing of the IoT-application may be more reliable.

This may be particularly beneficial in view of a heterogeneous nature of such IoT-devices, wherein, e.g., various types of IoT-devices may be connectable to a cloud platform for operating IoT-devices, and/or wherein the IoT-application is targeted for a multitude of IoT-devices, and thus, is required to be designed and to run smoothly on these IoT-devices. Likewise, such IoT-applications may also be of a heterogeneous nature and/or there may exist a multitude of different IoT-applications for the cloud platform, i.e. in particular, a multitude of different IoT-applications for being executed on IoT-devices connected to the cloud platform. The device registry may advantageously allow to register a multitude of IoT-devices, whereby these IoT-devices may be associated with the fleet of IoT-devices—i.e. in particular the fleet of IoT-devices may comprise or consist of the multitude of IoT-devices, which may be or are registered at the device registry. Hence, in some advantageous implementations, a testing entity—such as an owner or an operator of an IoT-device—may offer the IoT-device for testing of IoT-applications and register it, e.g. by sending a device offering message. Likewise, a multitude of IoT-applications and, in particular, tests for these IoT-applications, may beneficially be registered at the request registry.

Thereby, a number of IoT-devices available for testing the IoT-application may be beneficially increased and/or testing related costs such as costs for (owning) IoT-devices and/or costs for simulators/emulators may be reduced, whereby—for a given cost frame—the IoT-application may be executed on a higher number of IoT-devices and/or for a higher number of test runs, such that, in particular, a quality of the IoT-application may be (e.g. iteratively by fixing bugs found in test runs) enhanced.

Likewise, a number of IoT-applications available for being tested on the IoT-device may be beneficially increased, and thus, in particular, more tests may be executed on the IoT-device, whereby the utilization of the IoT-device may be increased and/or costs for the IoT-device may be reduced or, in particular, may be shared between multiple requesting entities—such as a user of an IoT-application, a developer of an IoT-application, or a platform provider providing an IoT-application—, which may request testing of an IoT-application on the IoT-device.

A second aspect of embodiments of the invention is directed to a system for testing an application based on a fleet of devices—wherein, in particular, the system is an IoT platform, the application is an IoT-application and the fleet of devices is a fleet of IoT-devices. The system comprises a plurality of devices associated with the fleet of devices—wherein, in some advantageous modifications, the fleet of devices consists of the plurality of devices or at least comprises several devices selected from the plurality of devices based on predefined criteria such as a required number or percentage of devices, at least one device for each type of (IoT-) devices of the plurality, at least one device for each operating system of the plurality of devices, or an assured availability of devices. Moreover, the system further comprises a fleet broker module and a test constructor module. The fleet broker module is adapted to determine a device entry indicative of a device of the fleet and a request entry indicative of the application to be tested. The test constructor module is adapted to establish an executable test case for the device. The device is adapted to execute, when it is triggered—in particular, by the test constructor module, or a test management system comprising of the test constructor module, or a test execution module of the test management system—, the executable test case—i.e., in some advantageous modifications, the test management system or test constructor module or the test execution module may cause the device to execute the executable test case by, e.g., transmitting the executable test case to the device.

The embodiments, advantageous modifications and further improvements as described in detail in connection with the first aspect of embodiments of the invention as well as potential benefits and advantages also apply correspondingly to the system according to embodiments of the invention. Hence, according to some embodiments, the system is adapted to perform a method according to the first aspect of embodiments of the invention.

A third aspect of embodiments of the invention is directed to a fleet broker system for a fleet of devices, in particular IoT-devices. The fleet broker system comprises a data communication interface, a data processing apparatus, a device registry, and a request registry. The data communication interface is data connectable to a plurality of devices associated with the fleet of devices. The device registry is adapted to store device entries being indicative of the devices associated with the fleet of devices. The request registry is adapted to store request entries being indicative of multiple applications to be tested, in particular multiple IoT-applications. Furthermore, the data processing apparatus is adapted to determine whether a device entry of the device registry matches with a request entry of the request registry and to establish, if the device entry matches with the request entry, a test case, wherein the test case is at least indicative of a device indicated by the device entry and an application indicated by the request entry.

The embodiments, advantageous modifications and further improvements as described in detail in connection with the preceding aspects of embodiments of the invention as well as potential benefits and advantages also apply correspondingly to the fleet broker system according to embodiments of the invention. By the device registry and the request registry, various IoT-devices and likewise various IoT-applications—or tests for IoT-applications—from different testing entities and request entities may be registered—i.e. in particular stored for subsequent retrieval/search/look up—, whereby flexibility of utilization of IoT-devices for testing IoT-applications and/or flexibility of requesting and/or performing tests may be beneficially enhanced. Thereby, different stakeholders such as IoT-device owners, cloud platform operators, IoT platform operators, IoT-application developers, and/or IoT-application users may interact in a reliable and/or secure and/or flexible manner, and hence, in particular, economies of scale may beneficially leverage testing of IoT-applications.

A fourth aspect of embodiments of the invention is directed to a test management system for testing an application—in particular an IoT-application—based on a fleet of devices—in particular IoT-devices. The test management system comprises one or more data communication interfaces, wherein at least one of the data communication interfaces is being data connectable to a plurality of devices associated with the fleet of devices, and wherein at least one of the data communication interfaces is being data connectable to a fleet broker system according to the third aspect of embodiments of the invention. Furthermore, the test management system comprises a test service repository adapted to store implementations of test services, wherein each of the implementations comprises instructions that are adapted to perform, when executed by a data processing apparatus of a device—of, e.g., the fleet—, a respective one of the test services. Moreover, the test management system is adapted to receive, from the fleet broker system and by means of the at least one of the data communication interfaces data connectable to the fleet broker system, a test case, wherein the test case is indicative of a device of the fleet, an application, and one or more test services to be executed on the device for testing the application. The test management system is further adapted to establish an executable test case based on the test case, wherein for each of the test services a respective implementation for the device is retrieved from the test service repository. The test management system is further adapted to transmit, to the device and by means of the least one of the data communication interfaces data connectable to the plurality of devices, the executable test case.

The embodiments, advantageous modifications and further improvements as described in detail in connection with the preceding aspects of embodiments of the invention as well as potential benefits and advantages also apply correspondingly to the test management system according to embodiments of the invention. By transmitting the executable test case to the IoT-device, the test management system may cause the IoT-device to execute the executable test case. Moreover, an advantage of receiving the test case from the fleet broker system and establishing the executable test case based on the test case and the test service repository may particularly be, that test services are implementations thereof may be reused for different test cases, whereby, in particular, reliability and/or safety (when running such test cases) may be beneficially enhanced. Furthermore, the test management system may synergistically interact with the fleet broker system, wherein the establishing of the test case by the fleet broker system and establishing of the executable test case by the test management system further facilitates testing of IoT-applications in a flexible manner, in which multiple stakeholders may share their resources—i.e. resources such as IoT-devices, IoT-applications, a cloud platform (which may implement a method according to the first aspect of embodiments of the invention and/or provide the fleet broker system and/or the test management system), an IoT platform comprising the cloud platform and a field platform providing a fleet of IoT-devices, implementations of test services or specific tests for an IoT-application, in particular when running on a specific IoT-device. Such a specific tests may be particularly relevant for users of the IoT-devices and IoT-applications such as manufacturers.

A fifth aspect of embodiments of the invention is directed to a computer program or a computer program product that comprises or provides instructions which, when the instructions are executed by a computer, cause the computer to carry out a computer-implemented method. The computer-implemented method comprises determining whether a device entry of a device registry matches with a request entry of a request registry, wherein the device entry is indicative of an device—in particular IoT-device—and the request entry is indicative of an application—in particular IoT-application—. Furthermore, the computer-implemented method comprises establishing, if the device entry matches with the request entry, an executable test case, wherein the executable test case is at least based on the device indicated by the device entry and the application indicated by the request entry. Moreover, the computer-implemented method comprises causing the device to execute the executable test case, wherein—in some advantageous implementations—the computer-implemented method triggers the execution of the executable test case on the device by transmitting the executable test case to the device.

The embodiments, advantageous modifications and further improvements as described in detail in connection with the preceding aspects of embodiments of the invention as well as potential benefits and advantages also apply correspondingly to the computer program and computer program product according to embodiments of the invention.

According to some embodiments, the computer program product may comprise a non-transitory computer-readable storage medium on which the computer program and/or the instructions are stored.

According to some embodiments, the computer program operates a cloud platform system for testing IoT-applications, wherein the cloud platform system comprises a fleet broker system according to the third aspect of embodiments of the invention and a test management system according to the fourth aspect of embodiments of the invention, and wherein the instructions are executed by a data processing apparatus of the cloud platform system, in particular of the fleet broker system.

The above summary is merely intended to give a short overview over some features of some embodiments and implementations and is not to be construed as limiting. Other embodiments may comprise other features than the ones explained above.

BRIEF DESCRIPTION

Some of the embodiments will be described in detail, with reference to the following figures, wherein like designations denote like members, wherein:

FIG. 1 schematically illustrates an IoT platform according to an embodiment; and FIG. 2 represents a flowchart of a method according to an embodiment.

DETAILED DESCRIPTION

In the following, various embodiments of the invention will be described in detail with reference to the appended figures. It is to be understood that the following description of embodiments is not to be taken in a limiting sense. The scope of embodiments of the invention is not intended to be limited by the embodiments described hereinafter or by figures, which are taken to be illustrative only.

The figures are to be regarded as being schematic representations and elements illustrated in the figures, which are not necessarily shown to scale. Rather, the various elements are represented such that their function and their general purpose become apparent to a person skilled in the art. Any connection or coupling between functional blocks, devices, components or other physical or functional units shown in the figures or described herein may also be implemented as an indirect connection or coupling. A coupling between components may be established over a wireless connection. Functional blocks may be implemented in hardware, firmware, software or a combination thereof.

FIG. 1 schematically illustrates an IoT platform 10 for testing an IoT-application based on a fleet 120 of IoT-devices, the IoT platform 10 according to an embodiment of the invention. Moreover, FIG. 1 shows a developer 32 of an IoT-application and a user 34 of the IoT-application, which are typically not part of the IoT platform, but may interact and/or communicate with the IoT platform 10, e.g. one of them (or both) may request testing of the IoT-application, and e.g. send a test requesting message to the IoT platform 10. Hence, the developer 32 and/or the user 34 may be, respectively, a requesting entity.

In an exemplary embodiment, the IoT platform 10 comprises a plurality 100 of IoT-devices 110, 112. At least some of the IoT-devices of the plurality 100 are associated with the fleet 120, and hence, the fleet 120 comprises these IoT-devices. Furthermore, in some advantageous implementations, the fleet of devices or at least some of the devices may be provided by a field system that comprises these IoT-devices and is, e.g. a part of the IoT platform. In some modifications, the plurality 100 may also comprise IoT-devices that are not associated or e.g. part of the fleet as illustrated by a separate group 121 of IoT-devices. This may beneficially allow to use some IoT-devices of the plurality 100, e.g. the ones that are part of the fleet 120 for testing IoT-applications, whereas other IoT-devices, e.g. those of group 121 are not used for testing. Such IoT-devices of group 121 may e.g. be critical for a manufacturing process. Moreover, in some advantageous modifications, the fleet 120 may comprise IoT-devices 122, 123 that are not comprised by the plurality 100, and which may be connectable to, yet not necessarily comprised by the IoT platform 10. Such IoT-devices 122, 123 may be provided by third parties. As FIG. 1 additionally illustrates, a device owner 36 or device operator may provide device 123 for running tests as a third party and, hence, may be a testing entity. In some modifications the IoT platform 10 is connectable to the IoT-devices 110, 112 and the group 121, but does not comprise them—i.e. in particular all IoT-devices are external to the IoT platform—, wherein—in some further implementations—the IoT platform is data connected at least to the IoT-devices associated with the fleet 120.

The IoT-device 110 is adapted to execute, when it is triggered, an executable test case. In some implementations, the IoT-device 110 is triggered by a test management system 300. In some implementations, the IoT-device 110 is triggered by a test execution module 310, e.g., of a test management system 300. In some implementations, the IoT-device 110 is triggered by receiving the executable test case, e.g. from the test management system 300, the test execution module 310, and/or a test constructor module 350, the test constructor module 350, e.g., of the test management system 300.

In some advantageous implementations, the IoT-device 110 comprises a data processing apparatus 114 and a device client module 116. Likewise, the IoT-devices 112, 122 and/or 123 may comprise a data processing apparatus and a device client module. The device client module 116 comprises an (industrial) client application running either directly on the IoT-device 110, i.e. in particular the data processing apparatus 114 is adapted to execute the (industrial) client application, or running on an edge device connected to the IoT-device 110, i.e. in some modifications (not shown in FIG. 1) the module 116 may be separate from the IoT-device 110. The client application is responsible for collecting information from the IoT-device 110 like device type, vendor, model, firmware version etc., for sending and accepting testing offers—i.e. in particular confirmation data and/or later indicative of device properties of the IoT-device 110—, for coordination of the execution of the executable test case on the device 110 and for collecting data during the execution. The device client module 116 may be adapted to connect the IoT-device 110 with other components of the IoT platform 10 such as a fleet broker system 200 or a test management system 300. The device client module 116 may be adapted to orchestrate and/or supervise testing on the IoT-device 110—i.e. in particular the execution of the executable test case—, and/or to take care of the communication with the fleet broker system 200 and/or the test management system 300.

In some advantageous implementations, the IoT-device 112 is a digital twin of a physical IoT-device. In some further implementations thereof, device 123 is a physical IoT-device and IoT-device 112 is a digital twin of device 123, whereby—in particular—a provider of the IoT platform 10 and/or of a field layer comprising the plurality of IoT-devices 100 may beneficially ensure that at least the digital twin 112 is available for running tests (in particular even if IoT-device 123 is e.g. not continuously or permanently provided by the third party). Likewise, the IoT-device 112 may be a digital twin of one of the IoT-devices of the group 121, whereby—in particular—also such IoT-devices of the IoT platform or connected/connectable to the IoT platform that are not (directly) used/available for testing may be (indirectly) provided for testing IoT-applications by a corresponding digital twin. Hence, beneficially, an IoT-application may be tested on the digital twin and—after successful testing—may be run on the respective physical IoT-device, which was—in particular—not available for testing. Moreover, device 123 may be a physical IoT-device and IoT-device 122 may be a digital twin of device 123, whereby—in particular—a third party may beneficially provide a digital twin, or accordingly, multiple digital twins with sophisticated emulation/simulation of the physical device 123, and, hence, availability and/or resources for testing may be enhanced.

In an exemplary embodiment, the IoT platform 10 comprises a fleet broker system 200 according to an embodiment of the invention and/or a fleet broker module 210. The fleet broker system 200 or, respectively, the fleet broker module 210 is adapted to determine a device entry indicative of the IoT-device 110 of the fleet 120 and a request entry indicative of the IoT-application to be tested.

For this purpose, in some advantageous implementations, the fleet broker system 200 comprises the fleet broker module 210, a fleet management module 220, a request management module 230, a data processing apparatus 240 and a data communication interface 242. Respectively, in some advantageous implementations, the fleet broker module 210 is data connected to a fleet management module 220, a request management module 230, a data processing apparatus 240 and a data communication interface 242—hence, in particular, in such implementations the fleet management module 220, the request management module 230, etc. may be external to the IoT platform 10. The data communication interface 242 is data connected to the plurality 100, and in particular to the IoT-device 110 via device client module 116.

The fleet management module 220 comprises a device registry 222 adapted to store device entries being indicative of the IoT-devices 110, 112, 122, 123 associated with the fleet 120 of IoT-devices. Furthermore, in some advantageous implementations, the fleet management module 220 comprises a device manager module 224. Hence, the fleet management module 220 may be beneficially responsible for the IoT-devices volunteering to be used for testing. For this purpose, in some implementations, the device manager module 224 handles device offering messages sent from IoT-devices—or more generally from testing entities—to be used for testing and creates an entry in the device registry 222. The device registry 222 may be implemented as a database containing all IoT-devices 110, 112, 122, 123 available for testing and additional describing information like device type, vendor, firmware, test services permitted for execution—i.e. in particular device properties—as well as constraints like device availability for testing. The set of describing attributes is not limited only to these.

The request management module 230 comprises a request registry 232 adapted to store request entries being indicative of IoT-applications to be tested. Furthermore, in some advantageous implementations, the request management module 230 comprises a request manager module 234. Hence, the request management module 230 may be beneficially responsible for requests coming from requesting entities such as developers or companies willing to test applications on IoT-devices. The requesting entity should first look into a test service registry 332, which test services are offered for testing (e.g. app deployment on specific device, app configuration on specific device, basic end-2-end tests like data transfer from device to IoT platform etc.) and selects the services that are then requested to use and on which IoT-device. A request (in particular a test requesting message) is sent to the request manager module 234. It processes the request and creates an entry in the request registry 232. The request registry 232 may be implemented as a database containing all requests including additional information like services to be tested, required hardware by vendor, firmware, model and (optional) constraints like prioritization, sequence of execution etc. The number of attributes describing the request entries is not limited only to these.

The fleet broker module 210 is adapted: to determine whether a device entry of the device registry 222 matches with a request entry of the request registry 232; and to establish, if the device entry matches with the request entry, a test case, wherein the test case is at least indicative of the IoT-device 110 indicated by the device entry and the IoT-application indicated by the request entry.

Furthermore, in some advantageous implementations, the fleet broker module 210 comprises a confirmation database 212, a confirmation manager module 216 and a smart predictor module 218. Based on this, the fleet broker module 210 takes care of bringing together requests for testing and offered devices (i.e. IoT-devices) for testing. For this purpose, the fleet broker module 210 checks in case of new entries in the device repository 222 or the request repository 232 between requests and offered devices and in case of a match, it sends a job to the confirmation manager module 216. The confirmation manager module 216 processes the data and forwards it to the smart predictor module 218. The smart predictor module 218 aims, based on the request and offer as well as possible constraints (such a device constraints and test constraints), as well as possible history data and data analytics methods, to predict values for an execution prediction including values for, in particular, execution time for every requested service and/or the smart predictor module 218 calculates an optimal execution sequence. Hence, the smart predictor module 218 may beneficially ensure that the requested test services can be really delivered considering the constraints from both IoT-device and app development such as test constraints. For this purpose, it makes predictions about the execution feasibility of the scheduled tests and looks for the optimal selection of test cases and the optimal schedule for the test execution. The estimations/predictions are sent back to the confirmation manager module 216, which creates an offer—i.e. in particular confirmation data, sent e.g. via data communication interface 242—for both, the IoT-device/the testing entity and the developer/requesting entity. If both agree upon the conditions (e.g. test services to be executed, number of test runs, and/or time/starting time/finishing time) the confirmation manager module 216 creates an entry in the confirmation database 212, such that the confirmation database may comprise all open orders and possibly all or some of finished orders, possibly including a status or a report for the way how the order was finished such as cancelled, completed etc.

At least one of the open orders is sent to the test management system 300, e.g. via data communication interface 242.

In some implementations the modules, in particular the fleet broker module 210, the fleet management module 220 and the request management module 220 are physical modules. Alternatively, some or all of these modules may be software-implemented by respective instructions, wherein these instructions are executed on a data processing apparatus, e.g. the data processing apparatus 240.

In an exemplary embodiment, the IoT platform 10 comprises a test management system 300 according to an embodiment of the invention and/or a test constructor module 350. The test management system 300 or, respectively, the test constructor module 350 is adapted to establish an executable test case for the IoT-device 110.

For this purpose, in some advantageous implementations, the test management system 300 comprises a test service system 330 as well as a data communication interface 342 data connected to the fleet broker system 200 and a data communication interface 346 data connected to the plurality 100 of IoT-devices. The test service system 330 comprises a test service registry 332 and a test service repository 334. The test service repository 334 is adapted to store implementations of test services, wherein each of the implementations comprises instructions that are adapted to perform, when executed by the data processing apparatus 114 of the IoT-device 110, a respective one of the test services. Hence, in some implementations, the test service system 330 is adapted to handle the available test services. The test service registry 332 may be adapted to store and list—i.e. in particular provide to an entity—all test services offered by a platform provider of the IoT platform 10 and described in detailed from technical point of view, i.e. what they do, what data they access, what kind of data they need as input, etc. This may beneficially allow device owners of IoT-devices and app developers to select the test services they want to allow for testing or want to request for testing. The test service repository 334 may be implemented as a code repository, which contains the implementations of the test services in a keyword manner, i.e. reusable and executable functions, which need to be parametrized. In some advantageous implementations, a keyword consists of a function name used to call the function, a set of parameters used to control the behaviour of the keyword and a body, which contains the implementation of the functional behaviour. Alternatively or additionally, a microservice technique is provided for the test services.

Moreover, for establishing the executable test case, in some advantageous implementations, the test management system 300 further comprises a test execution module 310, a test constructor module 350, a test analytics module 370 and a test reporting module 380. The test execution module 310 is adapted to handle confirmation data received from the confirmation manager module 216, to extract the necessary information (requested services, device information, etc.) and to forward this information to the test constructor module 350. Based on that information the test constructor 350 is adapted to search for the required keywords (i.e. executable automated functions also called "automation keywords") in the test service repository 334 and to construct an executable test case for enabling execution on the specific IoT device, i.e. the IoT-device 110. To do this the test constructor module 350 feeds the service source code with concrete test and environment data coming from the test request. The sum of all test sequences (test suite) is sent back to the test execution module 310. The test execution module 310 is adapted to forward the executable test case for execution directly to the device client module 116 for the IoT-device 110, in particular via the data communication interface 346. The test execution module 310 receives, from the device client module 116, after the test execution a protocol with the results, which it sends to the test analytics module 370. The test analytics module 370 is adapted to review the execution results and to extract and analyse data of the execution of the executable test case. The test analytics module 370 may be further adapted to verify whether the requested services are really executed and whether the tests have come to meaningful results. In some advantageous implementations, the test or some of the test services may be selectively re-executed, depending on whether they delivered meaningful results. The test analytics module 370 may be further adapted to find patterns using data analytics and data mining methods, which can be used by the smart predictor module 218, to facilitate making more reliable predictions for the test execution, i.e. in particular for improved execution predictions. The results are sent to the smart predictor module 218 to optimize its predictions and to the reporting module 380 to create a final report.

Hence, the test management system 300 may be adapted to:

receive, from the fleet broker system 200 and by means of the test execution module 310 and via the data communication interface 342, a test case—i.e. the confirmation data from the confirmation manager module 216—, wherein the test case/confirmation data is indicative of the IoT-device 110, and one or more test services to be executed on the IoT-device 110 for testing the IoT-application;

establish, by means of the test constructor module 350, an executable test case based on the test case, wherein for each of the test services a respective implementation for the IoT-device is retrieved from the test service repository 334; and transmit, to the IoT-device 110 and by means of the test execution module 310 and via the data communication interface 346, the executable test case.

In some implementations, in which the IoT platform 10, comprises the test constructor module 350, but not necessarily the test management system 300, other components of the test management system 300 may be external to the IoT platform 10, wherein—in some further modifications—the test constructor module 350 is data connected to components of the test management system 300 such as a test execution module 310, the test service system 330, the test analytics module 370 and/or the test reporting module 380; alternatively, in some further modifications, the test constructor module 350 may be adapted to establish the executable test case based on the test case and to trigger the IoT-device in a standalone manner.

In some advantageous implementations, the fleet broker system 200 and the test management system 300 are software-implemented and executed on a cloud platform.

For some advantageous implementations, the interplay of the components of the IoT platform 10, their functional configuration and/or further implementation details may be further elucidated in conjunction with FIG. 2. Moreover, when a flow of functions or method steps is described, in particular in conjunction an apparatus, the respective apparatus may—in some advantageous implementations—be adapted to perform these functions and/or method steps—e.g. when the test constructor module 350 triggers the execution of the executable test case on the IoT-device 110, in some of the respective implementations, the test constructor module 350 is adapted to trigger the execution of the executable test case and the IoT-device 110 is adapted to execute the executable test case, e.g. by receiving the executable test case and possibly an additional triggering signal.

FIG. 2 shows a flowchart of a computer-implemented method 400 for testing IoT-applications based on a fleet of IoT-devices, the method 400 according to an embodiment of the invention. Moreover, in some advantageous modifications, a system or IoT platform is adapted to perform the method 400 and is according to an embodiment of the invention and, in some further advantageous modifications, the IoT platform 10 described with reference to FIG. 1 is adapted to perform the method 400.

In an exemplary embodiment, the method 400 comprises the method conditions 410 and 414, and further comprises the method steps 412, 420, 422, 424, 430, 432, 434, 448, 442, 444, 440, 450, 456, 458, 470 and 480. Furthermore, the method 400 may comprise method condition 416, and the method steps 460, 462 and 464. The method starts at the start of the method 402 and ends at the end of the method 404. Furthermore, one or more of the method steps, in particular a sequence of method steps and/or the whole method 400 may repeatedly be performed.

At method condition 410, it is determined whether one or more device entries of a device registry match with at least one request entry of request entries of a request registry.

The device registry is adapted to store device entries being indicative of multiple IoT-devices associated with the fleet. Each of the device entries being indicative of one or more device properties including: a device type, a device vendor, a device model, a device location, a device firmware checksum, a device firmware name, or a device firmware version. The request registry is adapted to store request entries being indicative of multiple IoT-applications to be tested. Each of the request entries is indicative of respective device properties for determining a respective matching IoT-device on which a respective IoT-application is to be tested. Moreover, each device entry is further indicative of one or more available test services that are available for testing IoT-applications such as installing an application, sending data to an entity, sending data to the IoT platform, receiving data from an entity or the IoT platform, running an application, entering data to the running application, monitoring a physical property associated with the IoT-device, and/or moving a physical device of the IoT-device. Moreover, each of the request entries is further indicative of test-related information including one or more requested test services to be executed for testing the respective IoT-application. Additionally, in some further implementations, each of the request entries may further include a number of test runs for each of the requested test services—e.g. as a part of test-related information.

For determining whether one or more device entries match with the at least one request entry, at method condition 410, for each of the request entries, matching device entries are determined by looking up, in the device registry, device entries where the respective device properties match. The method condition 410 further comprises method step 412, wherein, at method step 412, for each of the request entries, for which one or more device entries matched, respective matching test services are determined by filtering the requested test services of the respective request entry by the available test services of each of the one or more devices indicated by the one or more device entries. If at least one of the requested test services indicated by one of the request entries is available by at least one of the IoT-devices indicated by a respective device entry, then the respective request entry and the respective device entry match, and accordingly, this respective request entry is the at least one request entry. A request entry matching with a device entry may also be called a matching pair or a pair of a matching device entry and a matching request entry. For the at least one request entry all matching device entries may be determined.

In some further modifications, each of the request entries is further indicative of one or more test constraints selected from a group comprising: a priority of the request entry, a priority of one of the requested test services, and time constraints such as a due time for finishing testing of a respective IoT-application. Accordingly, each of the device entries is further indicative of one or more device constraints selected from a group comprising: a list of identifiers of the available test services, an amount of time available for testing, a time schedule for testing, an amount of energy available for testing, an available power for testing, and a Carbon-dioxide footprint available for testing.

In some implementations, the fleet broker module 210 is adapted to evaluate method condition 410 and, accordingly, to perform method step 412.

Hence, in some implementations, when the fleet broker module 210 receives a signal indicating a new device entry in the device registry 222, the fleet broker module 210 gets all the information about the new device entry and it starts a search through all the request entries in the request registry 232. The fleet broker module 210 compares the requested devices in combination with the requested test services and the newly offered device in combination with the offered test services, e.g. requested device type versus offered device type, requested device vendor results offered device vendor, requested device model versus offered device model and so on. If there is a matching device entry indicating a matching IoT-device, then the fleet broker module 210 compares the offered test services with the requested ones, e.g. requested "install application" and "send data to platform" versus offered "install application" and "receive data from platform".

Hence, in some implementations, when the fleet broker module 210 receives a signal indicating a new request entry in the request registry 232, the fleet broker module 210 gets all the information about the new request entry and starts a search through all the device entries in the device registry 222. Correspondingly to the implementations described previously, the fleet broker module 210 compares the offered, available devices in combination with the offered test services and the requested device in combination with the requested test services, e.g. requested device type versus offered device type, requested device vendor versus offered device vendor, requested device model versus offered device model and so on. If there is a matching device entry indicating a matching IoT-device, then the fleet broker module 210 compares the requested test services with the offered ones by the matching IoT-device, e.g. requested "install application" and "send data to platform" versus offered "install application" and "receive data from platform".

If at least one of the request entries matches with at least one of the device entries—symbolized by <y>, the method 400 is continued at method step 448. Otherwise—symbolized by <n>—, at least one of the method steps 420, 422, 424 or the method steps 430, 432, 434 are executed, before method condition 410 is executed for a next iteration.

At method step 420, a device offering message is received, the device offering message being indicative of an IoT-device and a testing entity offering the IoT-device for testing.

For example, the device owner or operator 36 may offer the IoT-device 123 for testing IoT-applications, wherein the device owner/operator 36 may specify test services that are available for running tests of the IoT-applications. In some implementations, test services offered by a platform provider of the IoT platform 10 are retrieved from the test service registry 332. Then, for example, the owner/operator 36 select some of these test services and specifies them as the test services available for the IoT-device.

In some further implementations, the owner/operator looks in the test service registry 332, which test services can be possibly executed on his IoT-device. For every available test service in the test service registry there is a detailed technical description, e.g. what the services exactly do, what kind of data they access, what kind of data they require, etc. The device owner/operator then adjusts the settings of the device client module 116 for the IoT-device and decides, if his device should be offered for test execution or not and which test services are allowed to be executed.

In some further implementations, the device offering message is sent by the device client module 116 and is received by the device manager module 224.

In some further implementations, the device offering message may indicate that the IoT-device is available for testing. Moreover, the device offering message may contain device-specific details such as device type, vendor, model, firmware versions, etc., test-related settings (i.e. which test services are allowed to run on the device) and constraints (e.g. how much time is the device available for testing, desired energy consumption, CO2 footprint, etc.).

At method step 422, a device entry based on the device offering message is established. In some implementations, the device entry may be established by the device manager module 224.

At method step 424, the device entry is stored in the device registry. In some implementations, the device entry may be stored by the device manager module 224 in the device registry 222.

Hence, in some further implementations, for every new offer—i.e. in particular client offering message—there is a device entry in the device registry 222 created by the device manager module 224. Moreover, the device manager module 224 sends a signal to the fleet broker module 210, wherein the signal indicates that a new IoT-device or a new device entry—possibly of an already known IoT-device, but being indicative of other available test services—is been stored in the device registry 222. This signal may trigger performing/evaluating method condition 410.

At method step 430, a test requesting message is received, the requesting message being indicative of an IoT-application and a requesting entity requesting testing of the application.

For example, the developer 32 may request a test of an IoT-application—e.g. developed by the developer—, wherein the developer may further specify certain test services required and/or certain test services useful for testing the IoT-application.

In some implementations, the test requesting message is received by the request manager module 234.

In some implementations, the test requesting message indicates that a requesting entity such as the developer 32 or the user 34 looks for an IoT device or group of devices for testing. The test requesting message contains, in some further modifications, device-specific information (e.g. type of the requested device, vendor, model, firmware version, etc.), test-related information (i.e. which test services the app developer would like to test on the requested devices, number of test runs, etc.) and may additionally contain constraints (such as prioritization, time available for testing, etc.).

At method step 432, a request entry based on the test requesting message is established.

At method step 434, the request entry is stored in the request registry.

In some implementations, the request entry is established by the request manager module 234 and/or is stored by the request manager module 234 in the request registry 232.

Hence, in some further implementations, for every new request—i.e. in particular test requesting message—there is a request entry in the request registry 232 created by the request manager module 234. Moreover, the request manager module 234 sends a signal to the fleet broker module 210, wherein the signal indicates that a new IoT-application or a new request entry—possibly of an already known IoT-application, but being indicative other requested test services—is been stored in the request registry 232. This signal may trigger performing/evaluating method condition 410, e.g. for a further iteration.

Method step 448 is performed for all device entries that match with the at least one request entry, wherein a respective execution prediction for each of the matching test services of the at least one request entry and the respective device entry is established, wherein the execution prediction is indicative of resources of the respective IoT-device corresponding to the device constraints and required for executing the respective test service for the IoT-application indicated by the at least one request entry.

In some implementations, prior to method step 448 or as a part of performing/evaluating method condition 410, the fleet broker module 210 sends a message to the confirmation manager module 216, the message being indicative of the matching device entries matching with the at least one request entry and the respective matching test services—i.e. in particular test services that are not matching are not sent—, if the number of matching device entries is at least one. Furthermore, prior to method step 448 or as a part of performing/evaluating method step 448, the confirmation manager module 216 receives the message.

In some implementations, prior to method step 448 or as a part of performing/evaluating method step 448, the confirmation manager module 216 (e.g. of the fleet broker module 210) creates confirmation data for test execution between the matching IoT-devices—or respectively the respective testing entities associated with the matching IoT-devices—and the matching at least one request entry—or respectively the requesting entity associated with the at least one request entry. The confirmation manager module 216 gets from the respective entries in the device registry 222 and from the request registry 232 the constraints set by the IoT-device/testing and 30 and or a set by the requesting entity. The confirmation manager module one 16 sends this confirmation data to the smart predictor module 218, whereby the smart predictor module 218 may be triggered to establish an execution prediction for the IoT-device and the IoT-application and possibly the available/requested/matching services.

At method condition 414, it is determined whether for at least one of the device entries matching with the at least one request entry all of the matching test services can be executed for the respective number of test runs within the device constraints of the respective IoT-device, based on the respective execution prediction.

If this is the case—symbolized by <y>—, method step 442 is performed, wherein at least for this device entry and the at least one request entry a test case is established, the test case being indicative of an execution of each of the matching test services for the IoT-application and for the respective number of test runs.

Otherwise—symbolized by <n>—, i.e. in particular for such pairs of matching device entries and the at least one request entry, whose matching test services cannot, according to the respective execution prediction, all/completely/fully be executed within the respective constraints, method step 444 and method step 440 is performed.

At method step 444, a respective sequence of test services out of the matching test services based on the respective device constraints and the respective execution prediction is optimized. In some implementations, an available time for executing the test services may be too short, and hence, some of the matching test services may be selected for the respective sequence, while others are excluded. Furthermore, in some implementations, some of the matching test services may be excluded due to execution of them would violate one of the device constraints. Furthermore, in some implementations, selecting of test services or excluding test services may be based on weighting factors such as whether the respective test service is required for testing the IoT-application. This may beneficially allow to select such test services that are required for testing the IoT-application and/or such test services that do not require too many of limited resources such as available time, carbon dioxide footprint, etc. Moreover, the requested test services of the at least one request entry may be distributed over two or more respective sequences of test services for two or more device entries, which match with the at least one request entry. This may beneficially facilitate covering some or all of the requested test services, in particular even if none of the IoT-devices indicated by the matching device entries can perform all the requested test services, e.g. within the limited resources and/or within the respective device constraints.

At method step 440, for each of the matching device entries, a respective test case is established based on the IoT-application and the respective sequence of test services.

In some implementations, at method step 448, the smart predictor module 218 creates an execution prediction which aims to foresee if all tests—i.e. in particular test services—can be executed within a given time frame—i.e. time span indicated by the constraints—, if not (i.e. based on method condition 414) it aims to calculate, at method step 444, the optimal test sequence for best usage of the available time for execution. For this calculation smart predictor module 218 takes to account both the constraints from device-site—i.e. in particular the device constraints—as well as the constraints from the app development—in particular the test constraints—, but also historical key performance indicators and/or metrics from the past—i.e. from previous iterations of method 400 and/or from previously executed test cases—like mean-execution time of a test service performance on specific devices, etc. Such data may be retrieved from an estimation database; and, correspondingly, may be stored, after a test or running a test service, in the estimation database for the respective test/test service and/or for the respective IoT-device which executed test service.

In some implementations, the fleet broker module 210 performs the method steps 442 or 440, and hence, establishes the test cases based on all respective matching services or, respectively, based on the respective sequence of test services. In some further modifications, the fleet broker module 200 and transmits the test cases to the confirmation manager module 216. Alternatively, in some further modifications, the confirmation manager module 216 may be adapted to perform the method steps 442 or 440.

In some further modifications, the method 400 may comprise the method steps 460, 462 and 464 and the method condition 416, whereas other implementations might not comprise these method steps and method condition.

Method step 460 is performed after method step 440 or, respectively, after method step 442—i.e. in particular after a test case has been established. At method step 460, for each of the matching device entries, confirmation data is transmitted to a requesting entity associated with the at least one request entry and to a respective testing entity associated with the respective IoT-device as, e.g., indicated by the respective device entry. Each of the confirmation data being at least indicative of the respective test case, i.e. in particular the test case to be executed on the respective IoT-device indicated by the respective matching device entry.

At method step 462, acknowledgment data is received from the requesting entity for each of the confirmation data.

Method step 464 is performed for each of the testing entities, i.e. in particular for each of the matching device entries, wherein respective acknowledgment data is received from the respective testing entity.

In some implementations, the confirmation manager module 216 performs—i.e. is adapted to perform—method steps 460, 462 and 464 and to evaluate method condition 416. Hence, in some further implementations, after the confirmation data is established—i.e. by the confirmation manager module 216—, the confirmation data is sent back to the fleet broker module 210, wherein the fleet broker module 210 forwards the confirmation data to the requesting entity and the testing entity. If both agree and send back an acknowledgement, the confirmation data is sent to the test management system 300 or the test constructor module 350, and in some further implementations, in particular to the test execution module 310 of the test management system 300.

At method condition 416, it is determined whether one or more—or in some implementations all—of the test cases have been acknowledged by the requesting entity and the testing entities. In this case—symbolized by <y>—, method step 450 is performed for each of the test cases, which the requesting entity and the respective testing entity have acknowledged. Otherwise—symbolized by <n>—, the method 400 is continued at method condition 410 for a further iteration, wherein, in particular, another request entry may be determined as the at least one request entry for the further iteration. For this purpose, the at least one request entry of the current iteration may be removed from the request registry or may be marked such that it is ignored/skipped—e.g. for a predetermined time span or a predetermined number of iterations—when looking up matching device entries.

In some implementations, method step 450 is selectively performed, depending on whether all test cases have been acknowledged. This may beneficially allow to ensure that, while the testing of the IoT-application may be distributed over a multitude of IoT-devices—i.e. in particular the IoT-devices indicated by the matching device entries—, the testing is only performed as a whole, i.e. only when all the test cases may be performed on the IoT-devices, and hence, reliability of the test may be enhanced. On the other hand, performing method step 450 also when some of the test cases have not been acknowledged, may improve flexibility of running tests of the IoT-application, i.e. in particular, if some requested test services or IoT-devices are not available, other parts of the test may still be executed.

In some implementations, method step 450 is performed, when at least some or all of the test cases have been acknowledged, wherein method step 450 is performed for each of the test cases that have been acknowledged.

Alternatively, in some implementations—in particular implementations without acknowledgment, i.e. in particular without method condition 416—, method step 450 is performed after method step 440 or 442, wherein method step 450 is performed for each of the test cases established at method step 440 or 442.

At method step 450, a respective executable test case is established for the respective test case, based on the respective test case, the IoT-application and the respective matching test services for the IoT-application.

For each of the respective executable test cases, method step 456 is performed, wherein testing of the IoT-application is triggered, wherein the testing comprises executing the respective executable test case on the respective IoT-device.

Hence, in some implementations, the test management system 300, is adapted to perform—in particular as a part of performing method step 450—a test execution based on the confirmation data, wherein—e.g. by the test execution module 310—it receives the confirmation data from the fleet broker module 210 and extracts all necessary information from the confirmation data and forwards it to the test constructor module 350.

Moreover, in some implementations, the test constructor module 350 is adapted—in particular as a part of performing method step 450—to receive as input the test services to be executed, as well as environmental parameters like target device for execution (type, vendor, model, firmware version etc.) and test data parameters from the test execution module 310. Alternatively, in some implementations, the test constructor module 350 is adapted to receive the confirmation data. Based on this data test constructor module 350 looks in the test service repository 334 for the implementation of the test services indicated by the received data/confirmation data. The implementation of the test services is in form of reusable functions, so called automation keywords, in particular within the meaning of the field of test automation. Once found the keywords are instantiated with the environmental and test parameters. The result of this step is an executable test case as a sequence of keywords parametrized with concrete data. Hence, the test constructor module 350 is adapted to establish the executable test cases.

In some implementations, the test constructor module 350 triggers—in particular as part of performing method step 456—testing of the IoT-application, wherein the test constructor module 350 transmits the executable test cases to the respective IoT-devices, in particular to respective device client modules 116 of the IoT-devices. Alternatively, in some implementations, the test constructor module 350—in particular as part of performing method step 450—is adapted to send the executable test cases to the test execution module 310. Furthermore, the test execution module—in particular as part of performing method step 456—forwards each of the executable test cases to the respective IoT-device, in particular to a respective device client module 116.

FIG. 2 further illustrates a method 401 being performed on the respective IoT-device for testing the IoT-application, wherein the method 401 includes executing the respective executable test case on the respective IoT-device. In some implementations, this method 401 may be comprised by the method 400, while, in other implementations, the method 400 does not comprise method 401, and, in particular, does not comprise the execution of the executable test case. In some further implementations, the device client module 116 coordinates, on the device site, the test execution and collects test execution data or test feedback data—i.e. in particular indicative of results of the execution of the respective executable test case on the respective IoT-device—, which it bundles—i.e. in particular as a protocol—and sends back after test execution (or in some further modifications partially during execution) to the test management system 300, in particular the test execution module 310 or the test constructor module 350, or in particular to the test analytics module 370 and test reporting module 380.

At method step 458, a protocol at least indicative of results of the execution of the respective executable test case is received, at least for one or for each of the executable test cases executed on one of the IoT-devices.

In some implementations, the test execution module 310 performs method step 458, wherein, additionally, it forwards the protocol or, respectively, the protocols to the test analytics module 370 and to the test reporting module 380. Alternatively, in some implementations, the test analytics module 370 and/or the test reporting module 380 (directly) receive the respective protocol from each of the IoT-devices, in particular from the respective device client module 216 of the respective IoT-device.

At method step 470, the (respective) protocol is analyzed and results of the execution of the (respective) executable test case are extracted from the protocol. In some implementations, it is determined whether all of the test services of the executable test case have been executed and/or whether all of the executed test services have meaningful results, based—in some further modifications—on predetermined execution criteria such as a time span required or estimated to be required for execution of the respective test service; e.g. if the actual time span when executing the test service is too short or too long by a predetermined amount, the respective test service may be determined as not having a meaningful result or as not having been executed (i.e. in particular execution time span of zero). Furthermore, in some implementations, method step 448 may be further based on a collection of protocols comprising the respective protocol. In some implementations, determining of the execution prediction may be further based on an estimation database, wherein in the estimation database is adapted to store multiple protocols of executing executable test cases, and wherein at method step 470 the (respective) protocol is stored in the estimation database.

In some implementations, the test analytics module 370 is adapted—i.e. for performing method step 470—to analyze the protocol/protocols. Therefore, it may, in some further implementations, verify if all arranged test services—i.e. in particular matching test services or test services of the sequence of test services—were executed. Furthermore, in some further implementations, the test analytics module 370 collects execution key performance indicators, which are then communicated with the smart predictor module 218—i.e. in particular by means of the estimation database—, so that they can be considered for establishing and execution prediction and/or confirmation data for a next iteration. Any unexecuted tests—i.e. in particular test services or whole test runs—are reported to the test execution module 310, which reports it back to the confirmation manager module 216.

At method step 480, a test report is established based on the (respective) protocol. In some implementations, the report is transmitted to the requesting entity. Furthermore, in some implementations, the report is transmitted to the respective testing entity.

In some implementations, the test reporting module 380 is adapted—i.e. for performing method step 480—two process the protocol/protocols and to establish respective test reports for the requesting entity 32, 34. Furthermore, in some further implementations, the test reporting module 380 is adapted to send the test report to the requesting entity as a file or to provide an URL link for the test report. Alternatively, in some further implementations, the test reporting module 380 provides the test report (to the requesting entity 32, 34) by means of a reporting app in the IoT platform 10.

In some implementations, the method 400 may be repeated for a further iteration, wherein, in particular, another request entry may be determined as the at least one request entry for the further iteration. For this purpose, the at least one request entry of the current iteration may be removed from the request registry or may be marked such that it is ignored/skipped when looking up matching device entries—e.g. for a predetermined time span or a predetermined number of iterations if the test is not been executed successfully or e.g. marked as finished/completed when the test has been executed successfully.

In some embodiments, the confirmation manager module 216 may be implemented as a contract manager module and the confirmation database 212 may be implemented as a contract database, adapted to store a contract between a requesting entity and a testing entity in the contract database by the contract management module. Hence, the confirmation data—i.e. in particular the conditions of the contract (data)—, upon which the requesting entity and the testing entity may agree for performing the respective test, may be indicative of contractual conditions such as a price, payment conditions, or contractual penalties—besides conditions such as test services to be executed, a number of test runs, or a finishing time. Moreover, based on a verifying of the test analytics module 370, wherein the test analytics module 370 determines whether the requested services are really executed and whether the tests have come to meaningful results, the requesting entity may be charged—in particular based on the contract—depending on successfully executed tests and/or the requesting entity might not be charged in case of unsuccessful test services, i.e. in particular and reasonable charging may be avoided. Likewise the testing entity may be paid depending on test services successfully run. Moreover, in some implementations, the test report may selectively be provided to the requesting entity 32, 34 based on whether predetermined criteria such as a payment agreed upon by the contract are fulfilled. Moreover, in some implementations, after test execution or when the test report is provided, billing from the requesting entity to the IoT platform provider and/or from the IoT platform provider to the testing entity is triggered.

From the above the following conclusions can be drawn.

Within the meaning of the present disclosure an "IoT-device" may at least refer to a device connectable to the Internet or to a platform such as an IoT platform or a cloud. There are various types of IoT-devices such as CNC machines, robots, conveyors, (autonomous or Internet/cloud connected) vehicles like self-driving cars, trains, lamps, or windmills. Further, all these IoT-devices vary in terms of vendor (e.g. KUKA, FANUC, ABB just to name a few industrial robot vendors), device model, device firmware and so on.

A demand may arise due to, many of these IoT-devices being expensive, which makes it difficult for development companies to acquire for test all supported hardware devices.

Furthermore, a demand may arise due to:

Revenue loss: The huge variety of devices turns into a barrier for many (3rd party) companies to enter the IoT business and to contribute into IoT (ecosystem) platforms by developing and offering apps for that platform. As a result, the less apps (i.e. in particular IoT-applications) are available in the platform, the less attractive it is for the IoT device owners and operators, which are the major customers and users of the platform. Hence, there will be less generated revenue generated by the platform.

Non-conformance costs: The risk of hardware damage caused by the apps or data loss and unresolved security issues remains rather high, if the 3rd party applications are not thoroughly tested in their target environment. This can get even costlier if critical errors come into existence during production or operation time of the IoT devices.

High development costs: The costs for the quality assurance of the developed apps significantly increase. The reason for that is the hardware dependency leading to high efforts for proper testing on a broad range of devices, longer development lifecycles and last but not least high acquisition costs for hardware.

Within the meaning of the present disclosure an "IoT-application" may at least refer to a computer program adapted to be executed on a data processing apparatus of an IoT-device or on a device client module of an IoT-device, wherein the computer program comprises instructions that are adapted to control, when executed, the IoT-device or, in particular, some of its physical devices or functions such as the moving of a gripper of a robot being an IoT-device.

An advantage of the system, in particular the IoT platform, may particularly be that it may provide a hardware-based environment as a service—i.e. in particular the field layer and/or the IoT-devices of the fleet—and/or executable test cases, in particular based on test services, as executable hardware in the loop tests, whereby, in particular, hardware in the loop tests may be facilitated and provided in a secure, flexible and/or reliable manner. Likewise, the method for testing an application based on a fleet of devices may facilitate to provide the devices for testing—i.e. the fleet—as a service and may facilitate performing hardware in the loop tests with these devices.

According to some embodiments, the device is an industrial device adapted to monitor or perform a manufacturing step of a manufacturing process for manufacturing a product. Furthermore, the application comprises instructions that are adapted to control, when executed by a data processing apparatus of the device, the monitoring or performing of the device.

According to some embodiments, the device entry is indicative of a capability of a runtime environment provided by the device. Furthermore, the request entry is indicative of a performance requirement for a runtime environment associated with the application. Moreover, the executable test case is established based on a match between the capability and the performance requirement.

According to some embodiments, the fleet of devices is associated with a plurality of testing entities such as device operators.

According to some embodiments, the device entry is further indicative of one or more available test services that are available for executing the executable test case on the device. Furthermore, the request entry is further indicative of test-related information including one or more requested test services to be executed for testing the application. Furthermore, the determining of whether the device entry matches with the request entry comprises determining, as matching test services, which of the requested test services match with the available test services as indicated by the device entry. Furthermore, the establishing of the executable test case is, if at least one of the requested test services matches with one of the available test services, at least based on the matching test services and the application. Moreover, executing the executable test case comprises executing, on the device, at least one of the matching test services for the application.

According to some embodiments, the request entry is further indicative of one or more test constraints selected from a group comprising: a priority of the request entry, a priority of one of the requested test services, and time constraints such as a due time for finishing executing of the executable test case.

According to some embodiments, the device entry is further indicative of one or more device constraints selected from a group comprising: a list of identifiers of the available test services, an amount of time available for testing, a time schedule for testing, an amount of energy available for testing, an available power for testing, and a Carbon-dioxide footprint available for testing.

In some embodiments, in which the request entry is further indicative of test-related information, the test-related information further includes a number of test runs for each of the requested test services.

In some embodiments, in which the device entry is indicative of one or more available test services, if at least one of the requested test services matches with one of the available test services, it is determined whether all matching test services can be executed for the respective number of test runs within the device constraints. If this is the case, a test case is established, wherein the test case is indicative of an execution of each of the matching test services for the application and for the respective number of test runs.

In some embodiments, in which the device entry is indicative of one or more available test services, if at least one of the requested test services matches with one of the available test services, an execution prediction for each of the matching test services is established, wherein the execution prediction is indicative of resources of the device corresponding to the device constraints and required for executing the respective test service for the application. Furthermore, in some implementations, a sequence of test services out of the matching test services based on the device constraints and the execution predicting is optimized. This can involve minimizing or maximizing an objective function using numerical techniques.

In some embodiments, in which the device entry is indicative of one or more available test services, a test case is established based on the matching test services and the application, if at least one of the requested test services matches with one of the available test services. Furthermore, in some implementations, the method comprises transmitting confirmation data to a requesting entity associated with the request entry and to a testing entity associated with the device, wherein the confirmation data is at least indicative of the test case. Furthermore, the method further comprises receiving acknowledgment data from the requesting entity and receiving acknowledgment data from the testing entity moreover, the method further comprises selectively, depending on whether the test case is acknowledged by the requesting entity and the testing entity, establishing the executable test case at least based on the test case and triggering the testing of the application based on the executable test case.

According to some embodiments, the device registry is adapted to store device entries being indicative of multiple devices associated with the fleet of devices, wherein—in some implementations—each of the device entries is indicative of one or more device properties including: a device type, a device vendor, a device model, a device location, a device firmware checksum, a device firmware name, or a device firmware version.

According to some embodiments, the request registry is adapted to store request entries being indicative of multiple applications to be tested, wherein—in some implementations—each of the request entries is indicative of respective device properties for determining a respective matching device on which the respective application is to be tested.

In some embodiments, some of the devices of the fleet of devices are physical devices, in particular physical IoT-devices.

In some embodiments, some of the devices of the fleet of devices are digital twins of physical devices, in particular digital twins of physical IoT-devices. In some further implementations, some of the request entries stored in the request registry are indicative of whether or not the respective applications to be tested may be tested on a digital twin—i.e. in particular by comprising a device property specifying a digital twin or a respective test constraint. In some further implementations, the application is iteratively tested on one or more digital twins of one or more physical devices of the fleet and—after predefined criteria such as successful test runs and/or meeting safety measures and/or execution of the executable test case within the device constraints are fulfilled—the application is tested on the physical devices. Thereby, utilization and/or reliability and/or availability and/or safety may beneficially be enhanced.

Within the meaning of the present disclosure a "digital twin" of a physical device may at least refer to a digital replica of the physical device. Moreover, a digital twin of a physical IoT-device may be an emulation or simulation of the physical IoT-device—i.e. in particular a data processing apparatus adapted to emulate/simulate the physical (IoT-) device. The concept of digital twins may be further elucidated by e.g. https://en.wikipedia.org/wiki/Digital_twin.

According to some embodiments, the method further comprises receiving a device offering message, the device offering message being indicative of the device and a testing entity offering the device for testing. The method further comprises establishing the device entry based on the device offering message and storing the device entry in the device registry.

According to some embodiments, the determining of whether the device entry matches with the request entry comprises determining one or more matching request entries by looking up, in the request registry, request entries that respectively match with the device entry, wherein the matching request entries comprise the request entry.

In some embodiments, in which one or more matching request entries are determined, for each of the matching request entries a respective executable test case is established and/or for each of the matching request entries execution of the respective executable test case on the device is triggered.

According to some embodiments, the method further comprises receiving a test requesting message, the requesting message being indicative of the application and a requesting entity requesting testing of the application. The method further comprises, establishing the request entry based on the test requesting message and storing the request entry in the request registry.

According to some embodiments, the determining of whether the device entry matches with the request entry comprises determining one or more matching device entries by looking up, in the device registry, device entries that respectively match with the request entry, wherein the matching device entries comprise the device entry.

In some embodiments, in which one or more matching device entries are determined, for each of the matching device entries a respective executable test case is established and/or for each of the matching device entries execution of the respective executable test case on the respective device indicated by the respective matching device entry is triggered.

An advantage of the fleet broker system may particularly be that devices may be a registered in the device registry for testing, whereby providing third party devices for testing may be facilitated. Likewise, testing of third-party applications may be facilitated by, e.g., registering requests in the request registry.

By beneficially creating an executable test case and triggering the device to executed, hardware in the loop test may be automated.

An advantage of the smart predicting module may particularly be that smart test execution predictions may be provided based on the fleet of devices and that the resources—in particular i.e. the fleet of devices—may be used in an efficient manner.

By automatically analyzing the test protocol, in particular by the test analytics module, patterns may beneficially be found in the test protocol and data may be extracted from the test protocol. In some further implementations, data mining methods may be employed.

An advantage of the device client module may particularly be that provides an additional layer for arranging, coordinating and/or supervising the test execution on the device, and additionally may negotiate about the test execution, whereby flexibility of test execution and/or safety may be enhanced.

Moreover, by the device client module and/or the test constructor module and/or the fleet broker system remote test execution may be facilitated, in particular with regard to safety restrictions, infrastructure challenges and number of available devices.

Some embodiments may also provide one or more of the following advantages:

Significant cost reduction of application development costs due to savings for system testing in hardware-based environment;

Increased revenue for IoT device owners/operators and for the IoT platform operator;

More efficient development process achieved by reduced efforts for system testing in hardware-based environment and simulation-based environment;

Improved quality of industrial applications by early testing apps in their target environment;

More efficient usage of the available resources by decoupling the dependency between software and hardware during the development.

For example, the costs for testing are usually cumulated mainly by the costs for designing, implementing and preparing the tests for execution (effort-based costs) and by the costs for acquiring hardware and software for test (acquisition costs). Since, at least by some embodiments, devices for testing—i.e. in particular the fleet—may be provided as a service and/or also testing services, in particular for implementing a test of an application, may be provided, both, costs for hardware and for test software may beneficially be reduced. For example, acquisition costs for the hardware devices required to run the tests on real hardware devices may be reduced or avoided. For example, acquisition costs for software tools to simulate/emulate the target hardware devices may be reduced or avoided. For example, acquisition costs for the power PCs required to run these simulators/emulators may be avoided. For example, effort costs for implementation of end-to-end system tests, because there is no need (or the efforts will be drastically reduced) to implement on your own the tests, due to—in particular—the tests being beneficially constructed and executed by the IoT platform. For example, effort costs for know-how ramp up may be reduced, because no detailed know-how in hardware-in-the-loop (also called HiL or hardware in the loop) testing or simulation-based testing will be required.

An advantage particular in view of IoT platforms may particularly be that, while there may be a multitude of different IoT-devices and/or a multitude of different IoT-applications, and hence a huge number of possible combinations for possibly supported IoT-devices and IoT-applications, required combinations for testing and IoT-applications may be provided by the fleet broker system, and/or may be automatically triggered to be executed by the test management system.

By running a test of an application on devices coverage of the test may be enhanced and/or a time span for performing the test may be reduced. For example, before releasing an industrial IoT-application one should make sure the IoT-application behaves as expected on its target IoT-device. When providing target IoT-devices and tests as a service, such testing is made more reliable, flexible and/or less costly. Moreover, some embodiments may beneficially allow to test applications directly the target device, where the respective IoT-application is going to run. Moreover, some embodiments may beneficially allow to automatically test IoT-applications on all kind of devices, for which the respective IoT-application is designed to run.

An advantage of the IoT platform and/or the method may particularly be that it decouples a dependency between required hardware for testing—i.e. devices for testing—and developers as well as testers, whereby the hardware is not required to be on-site with developers or testers of an IoT-application.

Moreover, an advantage of testing the application based on the fleet may particularly be, that the fleet may be provided as a service, whereby, in particular, downtimes—i.e. when local hardware for testing would not be available—may be reduced or avoided.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for testing an application based on a fleet of devices, the method comprising:
   determining, by a processor of a computer, that a device entry of a device registry matches with a request entry of a request registry, wherein the device registry and the request registry each comprise a database, wherein the device entry is indicative of a device of the fleet, one or more available test services that are available for executing an executable test case on the device, and one or more device constraints, and the request entry is indicative of the application and test-related information including one or more requested test services to be executed for testing the application, and one or more test constraints, wherein the determining that the device entry matches with the request entry comprises determining matching test services by filtering, by the processor, the one or more of the requested test services by the one or more available test services as indicated by the device entry;
   establishing, by the processor, an executable test case, which is at least based on the matching test services and the application;
   triggering, by the processor, testing the application, wherein the testing comprises the executable test case being executed on the device by a processor of the device; and
   in response to at least one of the requested test services matching with one of the available test services, determining whether all matching test services are executed for a respective number of test runs within the one or more device constraints, and establishing a test case being indicative of an execution of each of the matching test services for the application and for the respective number of test runs, or
   in response to at least one of the requested test services matching with one of the available test services, establishing an execution prediction for each of the matching test services, wherein the execution prediction is indicative of resources of the device corresponding to the device constraints and required for executing the respective test service for the application, and optimizing a sequence of test services out of the matching test services based on the device constraints and the execution predicting.

2. The method of claim 1, wherein:
the device is an industrial device configured to monitor and/or perform a manufacturing step of a manufacturing process for manufacturing a product; and
the application comprises instructions that are configured to control, when executed by the processor of the device, the monitoring and/or performing of the manufacturing step by the device.

3. The method of claim 1, wherein:
executing the executable test case comprises executing, by the processor of the device, at least one of the one or more matching test services for the application.

4. The method of claim 3, wherein the one or more test constraints selected from a group comprising: a priority of the request entry, a priority of one of the requested test services, and time constraints such as a due time for finishing executing of the executable test case.

5. The method of claim 3, wherein:
the one or more device constraints selected from a group comprising: a list of identifiers of the available test services, an amount of time available for testing, a time schedule for testing, an amount of energy available for testing, an available power for testing, and a Carbon-dioxide footprint available for testing; and
the test-related information further includes a number of test runs for each of the requested test services.

6. The method of claim 3, wherein:

a test case based on the matching test services and the application is established, if at least one of the requested test services matches with one of the available test services;

further comprising:

transmitting confirmation data, the confirmation data at least being indicative of the test case, to a requesting entity associated with the request entry and to a testing entity associated with the device;

receiving acknowledgment data from the requesting entity;

receiving acknowledgment data from the testing entity; and selectively, depending on whether the test case is acknowledged by the requesting entity and the testing entity, establishing the executable test case at least based on the test case and triggering the testing of the application based on the executable test case.

7. The method of claim 1, wherein:

the device registry is adapted to store device entries being indicative of multiple devices associated with the fleet of devices;

each of the device entries being indicative of one or more device properties including: a device type, a device vendor, a device model, a device location, a device firmware checksum, a device firmware name, or a device firmware version;

the request registry is adapted to store request entries being indicative of multiple applications to be tested; and each of the request entries is indicative of respective device properties for determining a respective matching device on which the respective application is to be tested.

8. The method of claim 1, further comprising:

receiving a device offering message, the device offering message being indicative of the device and a testing entity offering the device for testing;

establishing the device entry based on the device offering message; and storing the device entry in the device registry;

wherein:

the determining of whether the device entry matches with the request entry comprises determining one or more matching request entries by looking up, in the request registry, request entries that respectively match with the device entry, wherein the matching request entries comprise the request entry;

for each of the matching request entries a respective executable test case is established; and for each of the matching request entries execution of the respective executable test case on the device is triggered.

9. The method of claim 1, further comprising:

receiving a test requesting message, the requesting message being indicative of the application and a requesting entity requesting testing of the application;

establishing the request entry based on the test requesting message; and storing the request entry in the request registry;

wherein:

the determining of whether the device entry matches with the request entry comprises determining one or more matching device entries by looking up, in the device registry, device entries that respectively match with the request entry, wherein the matching device entries comprise the device entry;

for each of the matching device entries a respective executable test case is established; and for each of the matching device entries execution of the respective executable test case on the respective device indicated by the respective matching device entry is triggered.

10. A system for testing an application based on a fleet of devices, the system comprising:

a plurality of devices associated with the fleet of devices; and a processor configured to:

determine a device entry indicative a device of fleet and a request entry indicative of the application to be tested; and to establish an executable test case for the device;

wherein a processor of the device is configured to execute, when it is triggered, the executable test case;

and wherein the system is configured to perform the method of claim 1.

11. A fleet broker system for a fleet of devices, the fleet broker system comprising:

a device registry configured to store device entries being indicative of the devices associated with the fleet of devices, one or more available test services that are available for executing an executable test case on the device, and one or more device constraints wherein the device registry comprises a database; and a request registry configured to store request entries being indicative of multiple applications to be tested and test-related information including one or more requested test services to be executed for testing the application, and one or more test constraints, wherein the request registry comprises a database;

a processor configured to:

determine that a device entry of the device registry matches with a request entry of the request registry, wherein the determining that the device entry matches with the request entry comprises determining matching test services by filtering, by the processor, the one or more of the requested test services by the one or more available test services as indicated by the device entry;

establish a test case, wherein the test case is at least indicative of a device indicated by the device entry and an application indicated by the request entry;

trigger testing the application, wherein the testing comprises the executable test case being executed on the device by a processor of the device;

in response to at least one of the requested test services matching with one of the available test services, determine whether all matching test services are executed for a respective number of test runs within the one or more device constraints, and establishing a test case being indicative of an execution of each of the matching test services for the application and for the respective number of test runs, or in response to at least one of the requested test services matching with one of the available test services, establish an execution prediction for each of the matching test services, wherein the execution prediction is indicative of resources of the device corresponding to the device constraints and required for executing the respective test service for the application, and optimizing a sequence of test services out of the matching test services based on the device constraints and the execution predicting.

12. A test management system for testing an application based on a fleet of devices, the test management system being connected to the fleet broker system of claim 11, comprising:
   a test service repository configured to store implementations of test services, wherein each of the implementations comprises instructions that are configured to perform, when executed by a processor of a device, a respective one of the test services; and
   a processor coupled to the test service repository, and configured to:
   receive, from the fleet broker system, a test case, wherein the test case is indicative of a device of the fleet, an application, and one or more test services to be executed on the device for testing the application;
   establish an executable test case based on the test case, wherein for each of the test services a respective implementation for the device is retrieved from the test service repository; and
   transmit, to the device, the executable test case.

13. A computer program product having a non-transitory computer readable storage device that comprises or provides instructions which, when the instructions are executed by a computer, cause the computer to carry out a computer-implemented method, the computer-implemented method comprising:
   determining that a device entry of a device registry matches with a request entry of a request registry, wherein the device entry is indicative of a device and one or more available test services that are available for executing an executable test case on the device and the request entry is indicative of an application and test-related information including one or more requested test services to be executed for testing the application, wherein the device registry and the request registry each comprise a database, wherein the determining that the device entry matches with the request entry comprises determining matching test services by filtering, by the processor, the one or more of the requested test services by the one or more available test services as indicated by the device entry;
   establishing an executable test case, wherein the executable test case is at least based on the device indicated by the device entry and the application indicated by the request entry;
   causing the device to execute the executable test case by a processor of the device;
      in response to at least one of the requested test services matching with one of the available test services, determining whether all matching test services are executed for a respective number of test runs within the one or more device constraints, and establishing a test case being indicative of an execution of each of the matching test services for the application and for the respective number of test runs, or
      in response to at least one of the requested test services matching with one of the available test services, establishing an execution prediction for each of the matching test services, wherein the execution prediction is indicative of resources of the device corresponding to the device constraints and required for executing the respective test service for the application, and optimizing a sequence of test services out of the matching test services based on the device constraints and the execution predicting.

* * * * *